United States Patent
Yamaji et al.

(10) Patent No.: US 9,130,849 B2
(45) Date of Patent: Sep. 8, 2015

(54) COMMUNICATION RESOURCE ASSIGNMENT SYSTEM FOR DISTRIBUTING RESOURCE ASSIGNMENT INFORMATION TO NETWORKED MANAGEMENT TARGET DEVICES

(75) Inventors: Masato Yamaji, Tokyo (JP); Kenji Oishi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 509 days.

(21) Appl. No.: 13/447,686

(22) Filed: Apr. 16, 2012

(65) Prior Publication Data

US 2012/0271950 A1  Oct. 25, 2012

(30) Foreign Application Priority Data

Apr. 20, 2011  (JP) ................. 2011-094063

(51) Int. Cl.
*G06F 13/00*  (2006.01)
*H04L 12/24*  (2006.01)

(52) U.S. Cl.
CPC ......... *H04L 41/0896* (2013.01); *H04L 41/0803* (2013.01); *H04L 41/145* (2013.01)

(58) Field of Classification Search
CPC .............. H04L 29/08144; H04L 29/06; H04L 29/08072; H04L 29/08171; H04L 12/5695; H04L 41/0896; H04L 41/0803; H04L 41/145
USPC ........................................................ 709/226
See application file for complete search history.

(56) References Cited

U.S. PATENT DOCUMENTS

2006/0173724 A1* 8/2006 Trefler et al. ............... 705/8
2009/0316628 A1 12/2009 Frederick et al.
2011/0022881 A1* 1/2011 Nakata ............................. 714/2
2011/0255518 A9* 10/2011 Agrawal et al. ............... 370/335

FOREIGN PATENT DOCUMENTS

| CN | 101682535 A | 3/2010 |
|---|---|---|
| EP | 2066142 A2 | 6/2009 |
| JP | 9-507372 A | 7/1997 |

(Continued)

OTHER PUBLICATIONS

European Search Report corresponding to European Patent Application No. 12163676.5, dated Aug. 29, 2012.
Zuo Yun, et al., Network Management in Wirelesshart Network for Industry Application, School of Information Science and Engineering, East China University of Science and Technology, Key Laboratory of Advanced Control and Optimization for Chemical Process, Ministry of Education, Shanghai, China, XP031828463, pp. 1-4.

(Continued)

*Primary Examiner* — Robert B Harrell
(74) *Attorney, Agent, or Firm* — Sughrue Mion, PLLC

(57) ABSTRACT

A communication resource assignment system may include a communication resource assignment tool that includes a communication resource assignment algorithm that receives previously acquired user information, and outputs resource assignment information calculated by the communication resource assignment algorithm, a resource assignment state managing unit that receives and stores the resource assignment information output from the communication resource assignment tool, and a communication resource distributing unit that accesses the resource assignment state managing unit, reads the resource assignment information, and transmits the read resource assignment information to a management target device that has output a communication resource request among a plurality of management target devices that perform communication with each other via a network.

14 Claims, 10 Drawing Sheets

(56) References Cited

FOREIGN PATENT DOCUMENTS

| JP | 2002-521990 A | 7/2002 |
| JP | 2006-510313 A | 3/2006 |
| WO | 96/12369 A1 | 4/1996 |
| WO | 00/07401 A1 | 2/2000 |
| WO | 2004/056008 A1 | 7/2004 |
| WO | 2008127631 A1 | 10/2008 |

OTHER PUBLICATIONS

Pablo Soldati, et al., Optimal Routing and Scheduling of Deadline-Constrained Traffice Over Lossy Networks, School of Electrical Engineering, KTH, SE-10044, Sockholm, Sweden, XP31846228, pp. 1-6.

* cited by examiner (*) REFER TO RESOURCES ASSIGNED BY RESOURCE ASSIGNMENT TOOL AND TRANSMIT RESULT TO MANAGEMENT TARGET DEVICE

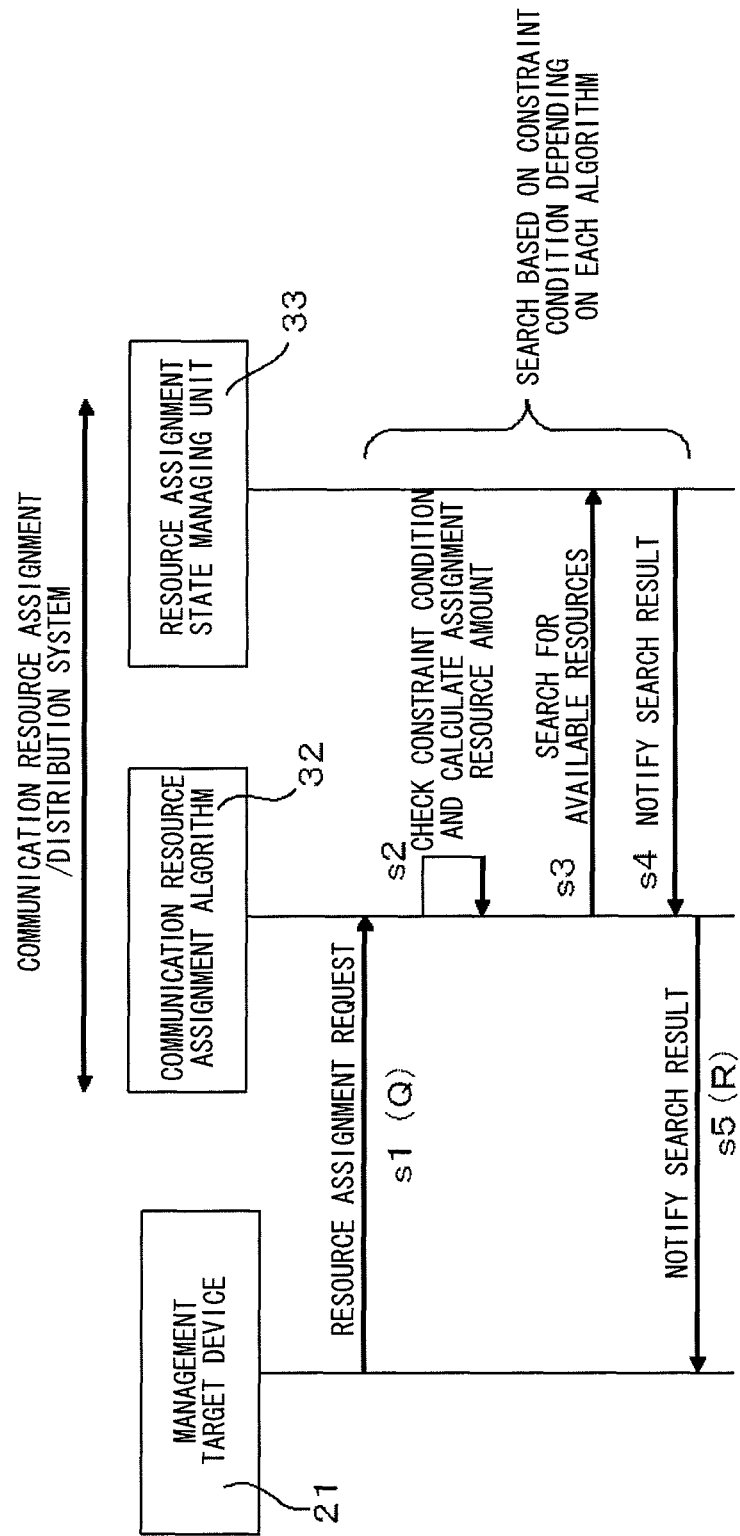

COMMUNICATION RESOURCE ASSIGNMENT SYSTEM FOR DISTRIBUTING RESOURCE ASSIGNMENT INFORMATION TO NETWORKED MANAGEMENT TARGET DEVICES

BACKGROUND OF THE INVENTION

1. Field of the Invention

The present invention relates to a communication resource assignment system in which a plurality of management target devices which are connected to a network and perform communication with each other request a communication resource distribution system to distribute communication resources via the network, and the communication resource distribution system accesses and reads communication resource assignment information stored in a resource assignment state managing unit, and transmits the read communication resource assignment information to the management target devices that have made a request.

Priority is claimed on Japanese Patent Application No. 2011-094063, filed Apr. 20, 2011, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

As a concrete example to which the present invention is applied, there are communication systems that conform to ISA100.11a and WirelessHART which are industrial wireless standards. However, the present invention is not specific only to wireless communication but can be widely applied to a general system in which a center collectively performs assignment, management, and distribution of communication resources.

A management target device that configures a communication system needs to acquire communication resources to use itself in some way. In a communication resource assignment system for which the present invention is intended, each management target device does not acquire communication resources, a resource management mechanism that collectively manages communication resources of the system is present in the system, and the resource management mechanism assigns necessary communication resources to each device.

Generally, communication resources refer to communication timing (time) or a communication path (space), and in case of a radio communication system, a radio channel (frequency) for communication is further included. Further, even when unique resources depending on each communication system are present, the unique resources are treated as communication resources in the present invention.

FIG. 9 is a functional block diagram illustrating a communication resource assignment system in accordance with the related art. The communication resource assignment system includes a plurality of management target devices 21 to 25 which are connected to a network 10 and perform communication with each other. The management target devices 21 to 25 transmit communication resource requests Q requesting communication resources to a communication resource assignment/distribution system 30. The communication resource assignment/distribution system 30 has a functional configuration of transmitting communication resource assignment information R to a management target device that has transmitted the communication resource request Q.

In the related art, the single communication resource assignment/distribution system 30 assigns and manages the communication resources and distributes the communication resources to the management target devices. Specifically, the communication resource assignment/distribution system 30 accumulates communication network information or communication quality information from each of the management target devices 21 to 25 as cumulative information. The communication resource assignment/distribution system 30 assigns communication resources determined to be optimal according to a predetermined evaluation criterion with reference to the cumulative information to a management target device which is a request source of the resource assignment request Q and an associated management target device as necessary in response to the resource assignment request Q from each of the management target devices 21 to 25.

The communication resource assignment/distribution system 30 includes a communication unit 31 that performs communication (including a communication protocol process) with the outside, a communication resource assignment algorithm 32 that decides resources to be actually assigned according to a predetermined criterion, and a resource assignment state managing unit 33 that holds an assignment state of the communication resources.

FIG. 10 is a sequence diagram describing an operation of the communication resource assignment system of FIG. 9.

In sequence s1, the management target device 21 transmits the communication resource assignment request Q to the communication resource assignment/distribution system 30. The communication unit 31 of the communication resource assignment/distribution system 30 receives the communication resource assignment request Q from the management target device 21, and transfers the information to the communication resource assignment algorithm 32.

In sequence s2, the communication resource assignment algorithm 32 checks resource assignment methods or various restrictions which are set in advance, and decides communication resources to be assigned to a device of a request source and communication resources that need to be assigned to another device (for example, a data relay device) in response to the request of the management target device.

In sequence s3, the communication resource assignment algorithm 32 designates the type and amount of necessary resources, accesses the resource assignment state managing unit 33 of a database configuration, and searches for non-assigned (non-used) resources necessary for assignment of the communication resources.

In sequence s4, the resource assignment state managing unit 33 notifies the communication resource assignment algorithm 32 of the resource information search result that can be assigned.

In sequence s5, the communication resource assignment algorithm 32 that has received the search result notice marks resource information stored in the resource assignment state managing unit 33 to represent that the resources have been assigned. Further, the communication resource assignment algorithm 32 distributes the communication resources by transmitting the communication resource assignment information R which is the search result of resource information that can be assigned to the management target device 21 of the resource request source and an associated device.

For management of communication resources on mobile devices in an environment in which a communication environment dynamically changes, for example, in a radio network, a method in which a communication resource management system automatically assigns communication resources based on a predetermined restriction or criterion which is decided in advance like the conventional method is useful as a predetermined communication quality securing means in terms of operational management.

However, when a mutual communication system is introduced to a management target device group in which an application is installed such that an installation position of a sensor or the like is fixed like a sensor network in an industrial system, and a data transmission amount or timing thereof (period) is already decided at the stage of system design, if the conventional method of dynamically assigning the communication resources to each management target device group is applied as is, the following problems occur.

(1) Automatically set resource assignment may be different from an operator's expectation.

In a system in which each communication device is arranged at a previously set position and performs communication at a previously set period, a user can be involved in assigning the communication resources such as a communication path or communication timing, and thus construction of a desired communication system is expected to be implemented.

However, in a system in which communication resources are automatically assigned according to a predetermined rule as in the conventional method, the automatically constructed communication resource assignment may be different from the operator's expectation.

Even in the conventional method, the above problem may be solved by allowing a detailed constraint condition to be input to the communication resource assignment algorithm and allowing the user to set the condition as he/she likes. In this case, however, time and effort for system setting increase.

(2) It is difficult to develop or exchange a resource assignment algorithm.

The communication resource assignment algorithm operates as a software component on a device in which a communication resource assignment/distribution system operates. In this operation environment, when algorithms performing different assignment techniques, that is, algorithms having different constraint conditions or different evaluation criteria for optimization, are introduced, it is necessary to implement and introduce an algorithm for each assignment technique. Thus, it is necessary to create software operating on the communication resource assignment/distribution system for each new algorithm.

When the communication system operates in a general-purpose operation environment such as a personal computer (PC), it is not problematic to develop software. However, when the communication system operates on a special device such as an embedded device, it is difficult to develop software, and the system has to be completely stopped when software is installed.

(3) A communication resource assignment/distribution system is required to have predetermined calculation capability, and thus a restriction occurs in the system configuration. Specifically, a process of checking an associated resource assignment state, searching for free resources satisfying a constraint condition, and performing a data operation according to a predetermined condition is generally performed.

When the number of management target devices or the amount of resources managed by the communication resource assignment/distribution system is small, it is not problematic. However, in a system in which hundreds or thousands of management target devices are managed or a system in which communication resources to be assigned are complexly associated, the communication resource assignment/distribution system needs to have a huge amount of resources in terms of hardware such as calculation capability or a memory.

It is desirable to construct an environment in which the communication resource assignment/distribution system implements a high-performance data process. However, when there is a restriction on processing performance due to a device installation environment (for example, explosion protection) or the cost, in order to secure an originally necessary calculation capability, the number of management target devices acceptable by the system or a communication band that can be assigned may be restricted due to the processing performance of the communication resource assignment/management system.

(4) Overhead is present in a resource management system.

In the conventional method, in order to assign communication resources regarded as being optimal, it is necessary to collect information associated with a communication state before assignment of communication resources. Even in a system in which a communication environment does not dynamically change or in a system in which it is known that a change is small, when a management system based on the assumption of a dynamic environment change is introduced, it is necessary to perform the maintenance of management information which was originally unnecessary, and thus overhead occurs.

SUMMARY

In the present invention, in a system in which system configuration and a data transmission amount are predictable at the stage of system design, a function of assigning communication resources is separated from a function of distributing assigned resources to a management target device. As a result, the communication resource assignment system of the present invention can statically assign communication resources in advance before system operation by a communication resource assignment algorithm process.

A communication resource assignment system may include: a communication resource assignment tool that includes a communication resource assignment algorithm that receives previously acquired user information, and outputs resource assignment information calculated by the communication resource assignment algorithm; a resource assignment state managing unit that receives and stores the resource assignment information output from the communication resource assignment tool; and a communication resource distributing unit that accesses the resource assignment state managing unit, reads the resource assignment information, and transmits the read resource assignment information to a management target device that has output a communication resource request among a plurality of management target devices that perform communication with each other via a network.

The resource assignment state managing unit may acquire the resource assignment information via a file unit from the communication resource assignment tool.

The resource assignment state managing unit may acquire the resource assignment information via the network by the communication resource assignment tool.

The resource assignment information is editable by a user or another system.

The user information may include at least one of network information, application information, and constraint condition information.

The communication resource assignment algorithm may access an external calculation library and use resources of the external calculation library.

The communication resource distribution unit may include: a communication environment change detecting unit that detects a communication environment difference between the resource assignment information stored in the resource assignment state managing unit and current resource assignment information of a management target device acquired via a network. The communication resource assignment tool may include a communication environment difference input unit that acquires the communication environment difference and revises the communication resource assignment algorithm.

The communication resource assignment tool may distribute resource assignment information of management target devices that perform communication with a plurality of communication resource distribution units connected via the network, respectively, to the plurality of communication resource distribution units.

A communication resource assignment method may include: generating resource assignment information calculated by a communication resource assignment algorithm that receives previously acquired user information; storing the generated resource assignment information; and reading the stored resource assignment information, and transmitting the read resource assignment information to a management target device that has output a communication resource request among a plurality of management target devices that perform communication with each other via a network.

The communication resource assignment method may further include: acquiring the resource assignment information via a file unit.

The communication resource assignment method may further include: acquiring the resource assignment information via the network.

The resource assignment information is editable by a user or another system.

The user information may include at least one of network information, application information, and constraint condition information.

The communication resource assignment method may further include: accessing an external calculation library and using resources of the external calculation library.

The communication resource assignment method may further include: detecting a communication environment difference between the stored resource assignment information and current resource assignment information of a management target device acquired via a network; and acquiring the communication environment difference and revising the communication resource assignment algorithm.

According to the present invention, a mechanism that allows a user or another system to utilize a communication resource assignment result can be provided. In other words, because a communication resource assignment tool is separated from a communication resource distribution system using "resource assignment information," it is easy for an operator or another system to utilize a communication resource assignment result.

Further, it is easy to assign communication resources to a plurality of different systems. By making the resource assignment tool independent and applying the method of the present invention, an operation environment of the resource assignment tool can be decided as one, and one communication resource assignment algorithm is implemented for one requirement. When only a format of prior setting information is decided, the assignment result can be input to a communication resource distribution system of any configuration.

Further, it is possible to share a resource distribution system even under different requirements.

In order to relate different requirements to resource assignment, it is necessary to replace the resource assignment algorithm. In the conventional method, since a resource assignment mechanism is integrated with a distribution mechanism, in order to replace an implementation of the resource assignment algorithm, it was necessary to update the whole resource assignment/distribution system. However, in the method of the present invention, the resource assignment algorithm can be replaced in an environment closed in the resource assignment tool.

For this reason, in the method of the present invention, when different communication resource assignment is performed for each system, it is solved by changing the algorithm on the resource assignment tool, and a common system can be used as the assignment resource distribution system regardless of system requirements.

Further, a complicated communication resource assignment process can be implemented on a high-performance machine.

In the communication resource assignment process, resources that satisfy both various constraint conditions and system requirements are searched, and thus complicated processing is generally required. When it is desired to support a large number of specially treated management target devices or a large application communication amount, complexity increases.

In the conventional method, it was necessary to perform all of the processes on the communication resource assignment/distribution system. In the method of the present invention, a complicated communication resource assignment process is executed in a device having high-performance calculation capability, and the communication resource distribution system can be notified of the result. Thus, the communication resource distribution system need not have high calculation capability, and thus there is a merit in terms of the cost, and it is possible to easily deal with an installation environment (for example, explosion prevention).

Further, since an operation of the communication resource assignment tool is completed at the stage in which resource assignment information is output, the communication resource assignment tool can be thereafter used for resource assignment of another system, and one assignment system can be used in a plurality of systems.

As illustrated in FIG. 3, distributed processing can be performed by causing a site installation device to perform a resource distribution function. The resource distribution system does not need complicated processing and thus operates even under a powerless environment. For this reason, management can be decentralized by sharing the communication resource assignment tool between a plurality of systems and preparing the communication resource distribution system for each system.

As illustrated in FIG. 4, it is easy to apply various support tools in connection with resource assignment. By operating the resource assignment tool on a general-purpose platform such as a PC, a tool specific to a field site or unique software such as a GUI can be easily added to the resource assignment tool.

As illustrated in FIG. 6, the communication resource assignment function is notified of the communication environment change difference through the communication resource distribution function. Thus, a change in a communication environment can be rapidly dealt with, and thus a reliable communication environment can be maintained. As a result, as illustrated in FIG. 8, in ISA100.11a which is an industrial wireless network requiring high reliability, it is possible to easily follow a change in a communication environment in the separate system of the present invention.

BRIEF DESCRIPTION OF THE DRAWINGS

The above features and advantages of the present invention will be more apparent from the following description of certain preferred embodiments taken in conjunction with the accompanying drawings, in which:

FIG. 10 is a sequence diagram describing an operation of the communication resource assignment system of FIG. 9.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
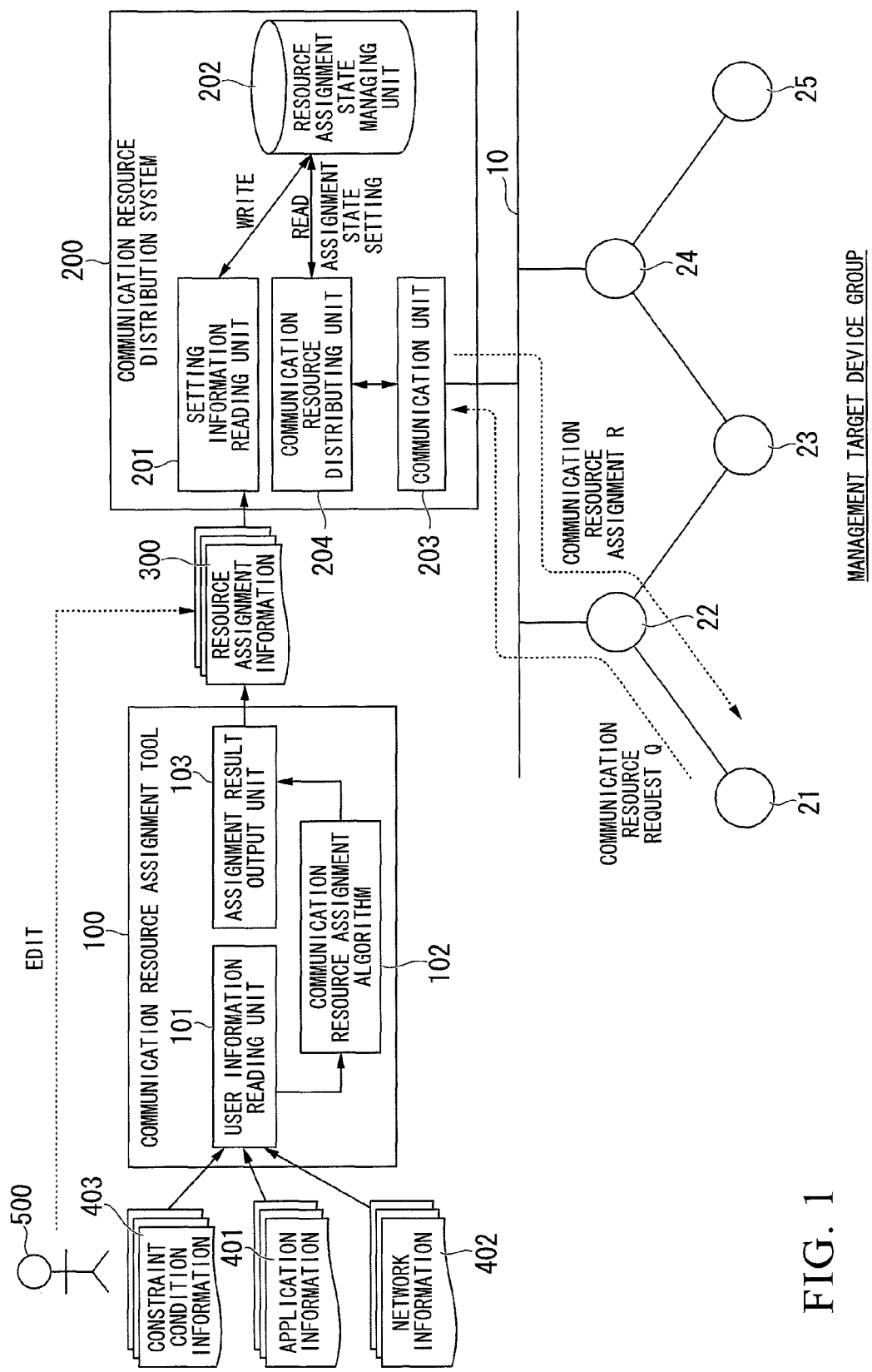
FIG. 1 is a functional block diagram illustrating a communication resource assignment system in accordance with a first preferred embodiment of the present invention.
Figure 9:
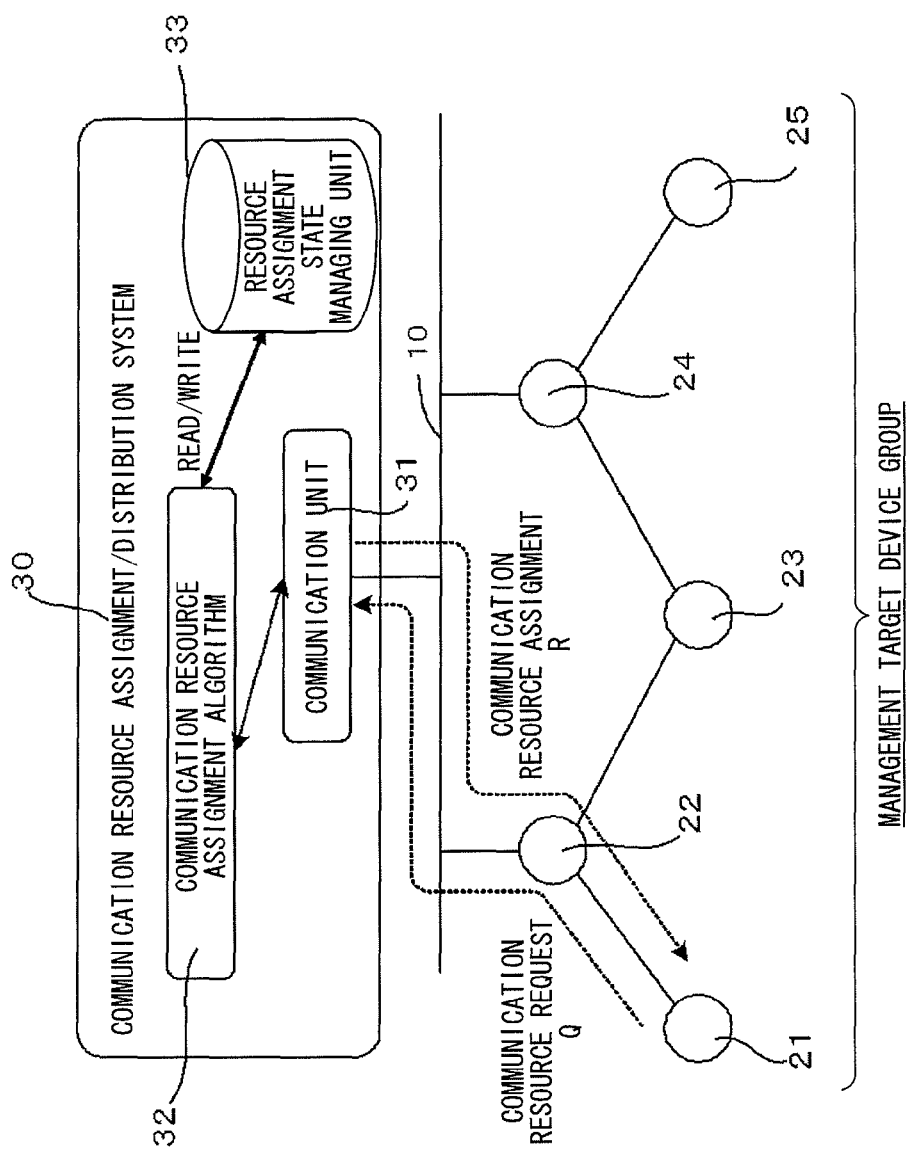
FIG. 9 is a functional block diagram illustrating a communication resource assignment system in accordance with the related art.

FIG. 1 is a functional block diagram illustrating a communication resource assignment system in accordance with a first preferred embodiment of the present invention. The same components as in the communication resource assignment system in accordance with the related art described with reference to FIG. 9 are denoted by the same reference numerals, and the redundant description thereof will not be repeated.

In the present invention, in a system in which system configuration or a data transmission amount is predictable at the stage of system design, assignment of communication resources is not dynamically performed during system operation but statically performed (by an off-line process) before system operation. Further, in the communication resource assignment system of the present invention, a function of assigning communication resources is separated from a function of distributing assigned resources to a management target device that configures a system.

The communication resource assignment system of the present invention includes a communication resource assignment tool 100 that performs assignment of communication resources, a communication resource distribution system 200 that supports a communication scheme depending on a system and distributes assigned communication resources to each management target device, and resource assignment information 300 that connects the communication resource assignment tool 100 with the communication resource distribution system 200.

The communication resource assignment tool 100 and the communication resource distribution system 200 may operate in the same device or may operate in different devices. In either case, the communication resource assignment tool 100 is connected with the communication resource distribution system 200 through the resource assignment information 300.

A file unit is an example of a concrete implementation technique of the resource assignment information 300. For example, a cooperative operation between the communication resource assignment tool 100 and the communication resource distribution system 200 is performed such that the communication resource assignment tool 100 outputs a set-up file in a specified format, and the communication resource distribution system 200 reads the output set-up file. It is possible to cause the file unit to have a function of allowing editing by a user 500.

As the specified format, any format can be used to the extent that there is agreement between the communication resource assignment tool 100 and the communication resource distribution system 200. As a concrete example, a general data description technique such as an XML file or CSV may be used.

When the resource assignment information 300 is implemented by the file unit, an external tool capable of reading and editing an output of the communication resource assignment tool 100 may be prepared, and the user may edit the result.

For example, in the case of a wireless system, a response to a request to manually control a specific communication band, a request not to use a specific channel in order to prevent interference, or the like may be made after the assignment of communication resources.

Further, when a problem unexpected at the design stage of communication resource assignment occurs at the time of system construction, for example, when it is difficult to perform communication between specific devices, it requires a high cost to cause the information obtained from an arrangement site of a system to return to a resource assignment tool and then to re-calculate all assignment resources.

In the system configuration of the present invention, resource assignment information output from a resource assignment tool is first edited and then re-input to the communication resource distribution system, so that information obtained from a system application site can be easily fed back.

In addition to a configuration connected by the file unit, a connection form by communication via the network 10 or inter-process communication may be used as a method of connecting two functional blocks as will be described later with reference to FIG. 6.

In the present invention, the communication resource assignment tool 100 is a tool independent of the communication resource distribution system 200, can operate in an arbitrary environment, and is executed off-line before an operation of a target system.

The communication resource assignment tool 100 includes a user information reading unit 101, a communication resource assignment algorithm 102, and an assignment result output unit 103. The user information reading unit 101 reads application information 401, network information 402, and constraint condition information 403 which are input by the user 500 and transfers the read information to the communication resource assignment algorithm 102.

For example, the application information 401 includes a communication period, a data length, a transmission source, a reception destination, and the like. For example, the network information 402 includes arrangement information of a device, a network function mounted in each device such as the presence or absence of a data relay function, network topology information, and the like. The constraint condition information 403 includes communication interference information, information related to communication resource assignment such as a latency request, and the like.

The communication resource assignment algorithm 102 assigns communication resources according to an evaluation (determination) criterion specific to each algorithm based on the application information, the network information, and the constraint condition information input through the user information reading unit 101.

As an example of the evaluation criterion, minimization of a communication delay time, minimization of a communication jitter, minimization of power consumption of the whole system, minimization of power consumption of a specific device, maximization of the amount of allowable communication, minimization of communication error, or the like may be used, and communication resource assignment is performed to satisfy various input conditions and the evaluation criterion.

The communication resource assignment algorithm 102 is implemented by software. Thus, by causing the resource assignment algorithm to have an exchangeable architecture and preparing algorithms corresponding to a plurality of evaluation criteria, communication resource assignment corresponding to a plurality of requests can be performed through a single resource assignment tool.

The assignment result output unit 103 converts the communication resource assignment result by the communication resource assignment algorithm 102 into a format readable by the communication resource distribution system, and outputs the conversion result as the resource assignment information 300 which is previously set.

Further, in the communication resource assignment tool 100, an operation before an operation of a communication system which is a management target is assumed. However, when information input to a tool changes, or when an unexpected problem occurs in a network during an operation and thus it is necessary to review assigned communication resources, the communication resource assignment tool may be re-executed even during an operation of the system to re-execute resource assignment corresponding to a new condition or environment.

The communication resource distribution system 200 actually distributes the communication resources in an order previously set to each system in response to the communication resource request Q from each management target device based on the resource assignment information 300 output from the communication resource assignment tool 100.

The communication resource distribution system 200 includes a setting information reading unit 201, a resource assignment state managing unit 202, a communication unit 203, and a communication resource distributing unit 204.

The setting information reading unit 201 reads the resource assignment information 300 output from the communication resource assignment tool 100, and stores the data in the resource assignment state managing unit 202.

When the management target devices 21 to 25 of the system transmit the communication resource request Q to the communication resource distribution system 200, the communication unit 203 receives the communication resource request Q and notifies the communication resource distributing unit 204 of the reception of the communication resource request Q. The communication resource distributing unit 204 accesses the resource assignment state managing unit 202 and searches for communication resources corresponding to the communication resource request Q.

At this time, the communication resources needed by each of the management target devices 21 to 25 have already been assigned by the communication resource assignment tool 100, and communication resource information corresponding to the communication resource request Q remains stored in the resource assignment state managing unit 202.

The communication resource distributing unit 204 notifies the management target device of the request source of communication resource information which is a result of searching the resource assignment state managing unit 202 through the communication unit 203. At this time, an associated device such as a relay device is also notified of the communication resource information as necessary.

Through this configuration, the communication resource distribution system 200 need not have a complicated algorithm process related to communication resource assignment, and thus simple hardware/software can be mounted. As a result, the communication resource distribution system 200 need not have high calculation capability and can be operated in a system having low calculation capability such as a field installation device.

The management target devices 21 to 25 that construct the system exchange the communication resource information with the communication resource distribution system 200 that distributes the communication resource information according to a communication protocol corresponding to each system. The management target devices 21 to 25 do not recognize the presence of the communication resource assignment tool 100 that decides communication resources to actually be distributed.

As described above, in the first preferred embodiment of the present invention, an implementation at the management target device is the same as in the conventional system and need not be changed at all.

Figure 2:
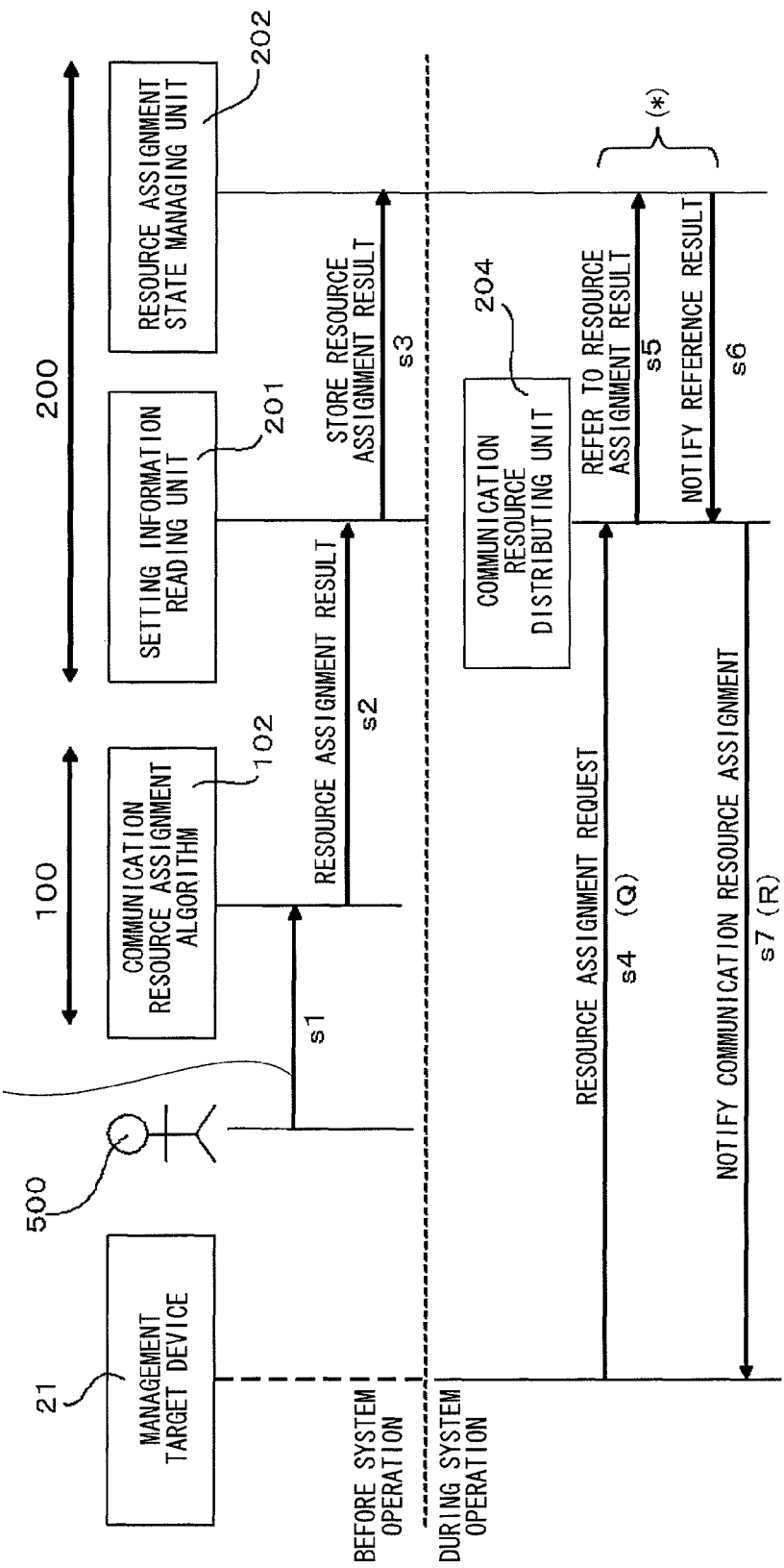
FIG. 2 is a sequence diagram to explain an operation of the communication resource assignment system of FIG. 1.

FIG. 2 is a sequence diagram to explain an operation of the communication resource assignment system of FIG. 1.

Sequence s1, s2, and s3 are performed before system operation.

In sequence s1, the application information, the network information, and the constraint condition information are input to the communication resource assignment algorithm 102 by the user 500.

In sequence s2, the resource assignment result by the communication resource assignment algorithm 102 is transmitted to the setting information reading unit 201.

In sequence s3, the resource assignment result is stored in the resource assignment state managing unit 202.

Sequence s4 to s7 are performed during system operation.

In sequence s4, the management target device 21 transmits the resource assignment request Q to the communication resource distributing unit 204.

In sequence s5, the communication resource distributing unit 204 accesses the resource assignment state managing unit 202 and refers to the communication resource assignment result.

In sequence s6, the resource assignment state managing unit 202 notifies the communication resource distributing unit 204 of the result of referring to the communication resource assignment result.

In sequence s7, the communication resource distributing unit 204 notifies the management target device 21 of the request source of the communication resource request Q of the communication resource assignment information R.

Second Preferred Embodiment

Figure 3:
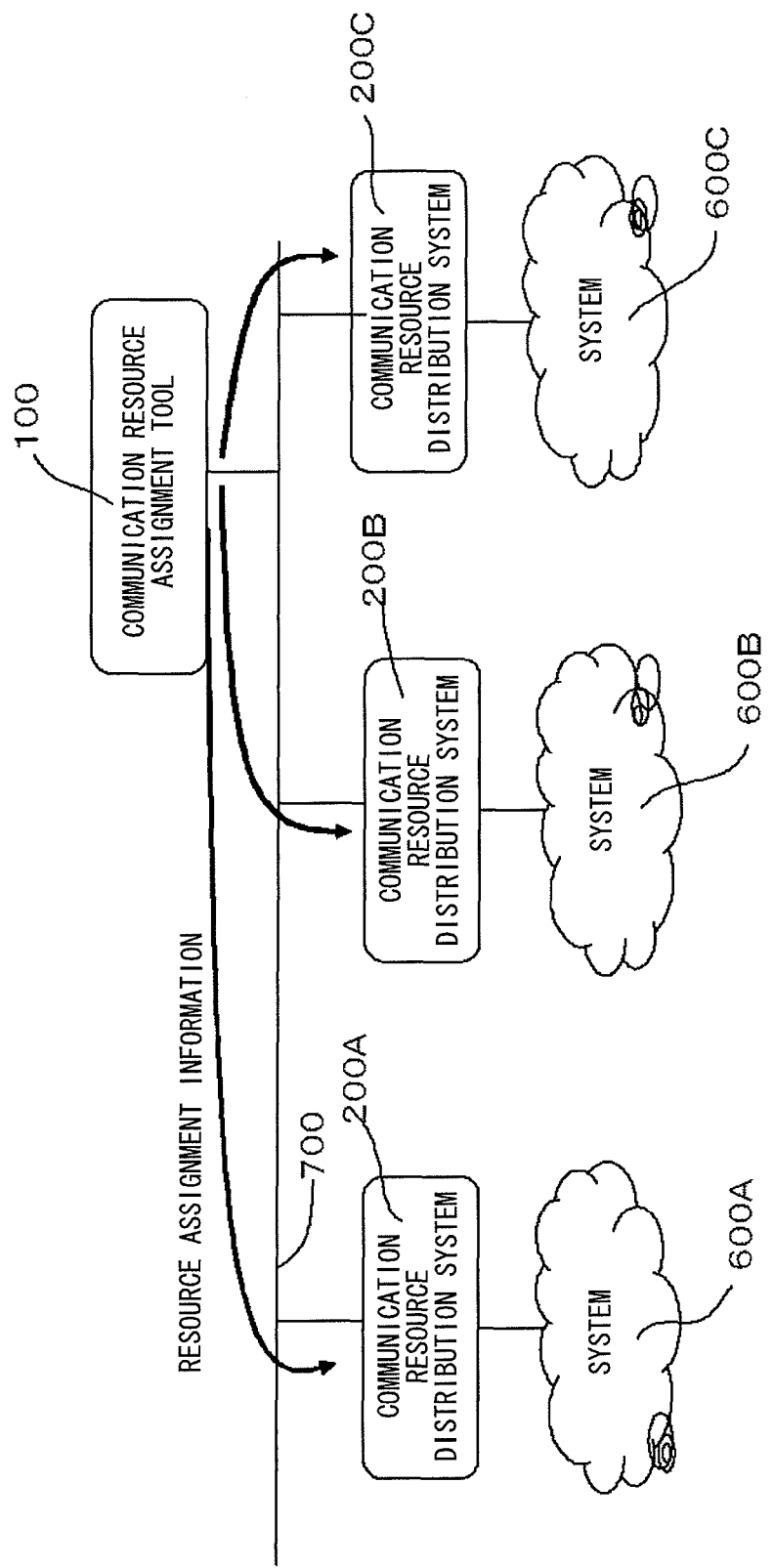
FIG. 3 is a functional block diagram illustrating a communication resource assignment system in accordance with a second preferred embodiment of the present invention.

FIG. 3 is a functional block diagram illustrating a communication resource assignment system in accordance with a second preferred embodiment of the present invention. In the second preferred embodiment, a single communication resource assignment tool 100 assigns communication resource distribution systems 200A, 200B, and 200C to a plurality of systems 600A, 600B, and 600C, respectively, and notifies the communication resource distribution systems 200A, 200B, and 200C of prior setting information related to the corresponding systems 600A, 600B, and 600C in advance, respectively.

The communication resource assignment tool 100 notifies the communication resource distribution systems 200A, 200B, and 200C of prior assignment results of communication resources of the systems 600A, 600B, and 600C in advance, respectively, and thus a closed system can be constructed in each system. In other words, the communication resource distribution systems 200A, 200B, and 200C can construct a system by the following configuration. In this distributed configuration, since it is possible to operate a system without exchanging information with a central system, there is a merit in terms of fault tolerance.

In the communication resource assignment system in accordance with the related art, the communication resource assignment algorithm 32 mounted on the communication resource assignment/distribution system 30 automatically decides assignment of communication resources. For this reason, when it is desired to construct a system realizing a desired requirement, the communication resource assignment algorithm 32 needs to be implemented and installed on the communication resource assignment/distribution system 30 for each requirement.

However, the communication resource assignment/distribution system may have a hardware or software environment that differs according to a system to be applied. In this case, even when the same requirement is realized, it may be necessary to implement a communication resource assignment algorithm corresponding to each system.

In the present invention, the communication resource assignment tool 100 is made independent. Thus, an operation environment of the communication resource assignment tool can be decided uniquely, and one communication resource assignment algorithm is implemented for one requirement. When a format of prior setting information is decided in advance, the communication resource assignment result can be input to a communication resource distribution system of any configuration.

Generally, the communication resource distribution system 200 may be restricted in usable devices according to an application, a network, an installation environment, or the like. A restriction is, for example, a power consumption that satisfies an explosion-proof performance.

The algorithm of the communication resource assignment tool 100 that performs assignment of communication resources needs to perform a complicated calculation in order to perform resource assignment satisfying a complicated restriction and thus needs to have highly accurate calculation performance. Further, for example, many mathematical function libraries necessary for communication resource assignment or optimization thereof are already available.

For example, many algorithms for solving a coloring problem to prevent communication interference or many mathematical programming solvers are available regardless of whether they are commercial or non-commercial. By using the algorithms or solvers as a resource assignment calculation engine, the implementation of the resource assignment algorithm can be simplified.

Third Preferred Embodiment

Figure 4:
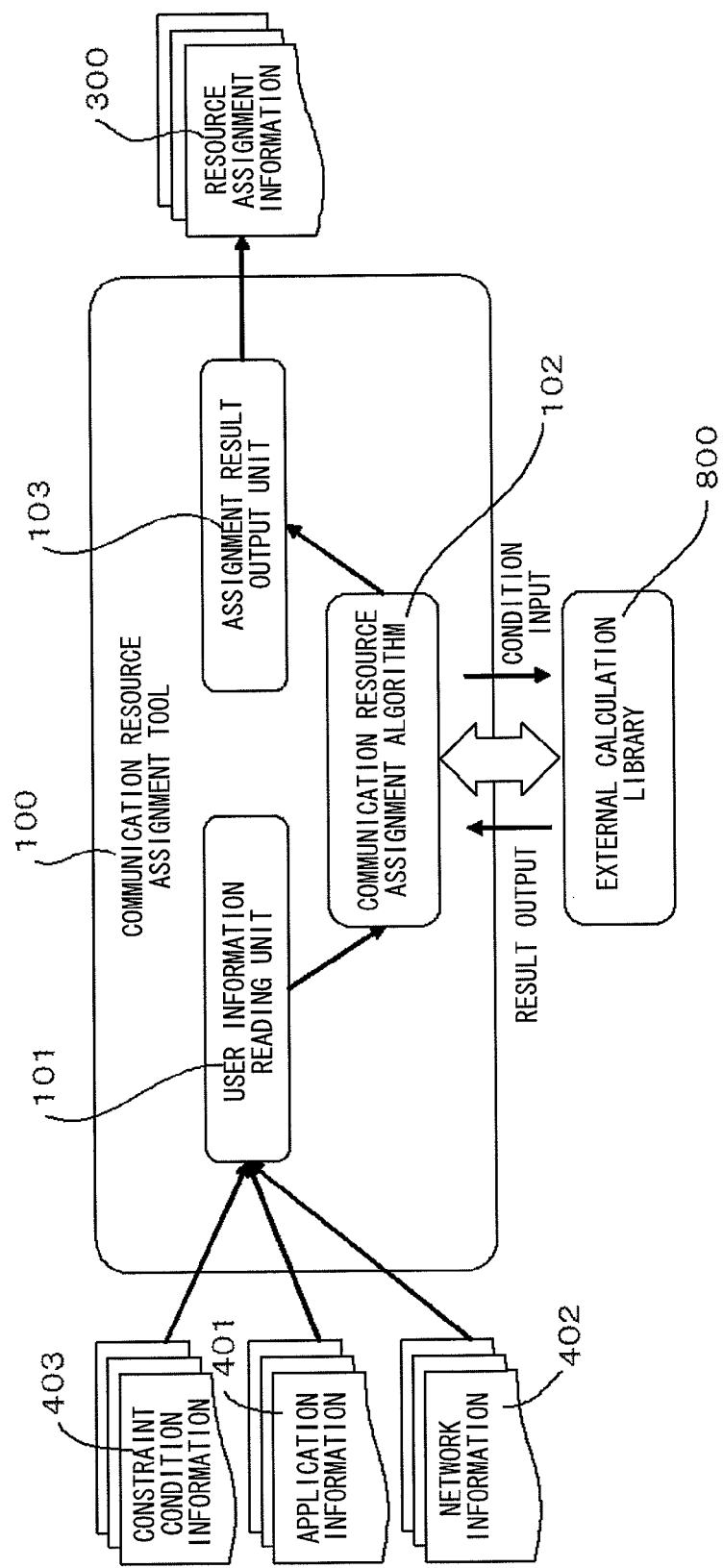
FIG. 4 is a functional block diagram illustrating a communication resource assignment system in accordance with a third preferred embodiment of the present invention.

FIG. 4 is a functional block diagram illustrating a communication resource assignment system in accordance with a third preferred embodiment of the present invention. In the present invention, a tool 100 that performs communication resource assignment is separated from a communication resource distribution system 200 that actually notifies a device of resource information.

In the third preferred embodiment, a communication resource assignment algorithm 102 cooperates with an external calculation library 800. The communication resource assignment algorithm 102 does not internally include a calculation library necessary for resource assignment such as a mathematical program solver. The communication resource assignment algorithm 102 inputs a condition to the external calculation library 800 as necessary, and acquires a calculation result output from the external calculation library 800.

The communication resource assignment tool 100 outputs data readable by the communication resource distribution system 200, and thus there is no restriction on an operation environment of the communication resource assignment tool 100. For this reason, by preparing hardware or software satisfying an operation requirement of the external calculation library 800 and operating the communication resource assignment tool 100 on the hardware or software, it is possible to implement the communication resource assignment tool 100 that performs an operation in cooperation with the external calculation library 800.

In the third preferred embodiment, it is unnecessary to implement a complicated calculation library in the communication resource assignment algorithm 102, and a library corresponding to a system requirement such as a library having a merit in cost, a library having optimal performance, and a library that can be assigned in a short calculation time can be used. Thus, merits which are hardly realized in the related art can be obtained.

Generally, a high-performance calculation library is relatively expensive. In the third preferred embodiment, since only the communication resource assignment tool 100 needs to introduce the external calculation library 800, the function of the external calculation library 800 is not used during system operation. In other words, the communication resource assignment tool 100 can be used by the plurality of systems 600A, 600B, and 600C illustrated in FIG. 3, and there is a metric for operation of a plurality of systems in terms of the cost.

Figure 5:
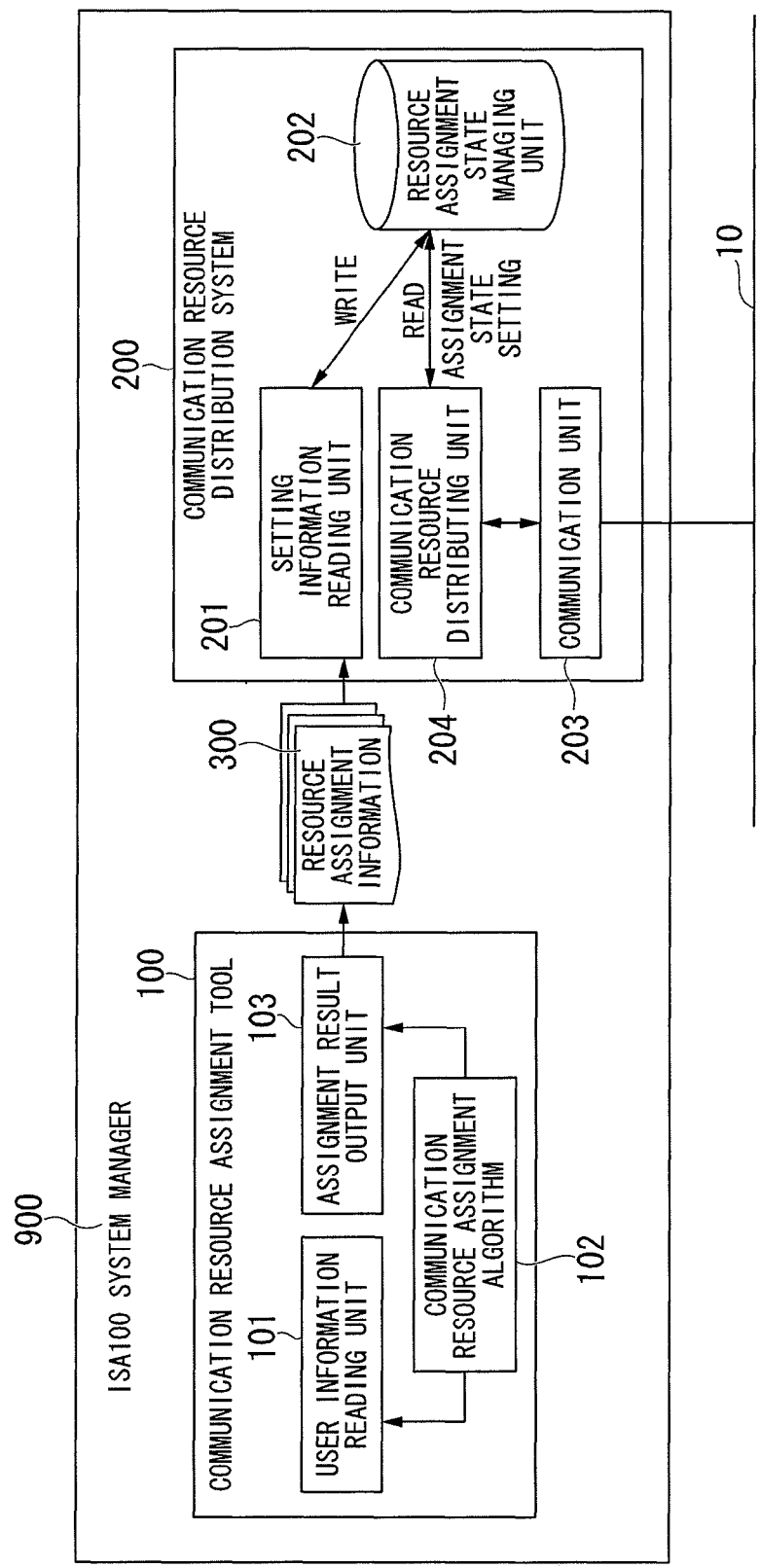
FIG. 5 is a functional block diagram illustrating an ISA100 system manager in accordance with a fourth preferred embodiment of the present invention.

In order to perform communication resource assignment in cooperation with an external calculation library in the communication resource assignment system illustrated in FIG. 9 in accordance with the related art, a platform corresponding to a calculation library and a communication resource assignment/distribution system having calculation performance required by a calculation library are necessary. Further, it is necessary to introduce a calculation library for each system to be operated, and there is a disadvantage in terms of the cost. Fourth Preferred Embodiment The present invention can be applied to an industrial wireless standard ISA100.11a (hereinafter, "ISA100"). FIG. 5 is a functional block diagram illustrating an ISA100 system manager in accordance with a fourth preferred embodiment of the present invention. The communication resource assignment/distribution system 30 illustrated in FIG. 9 in accordance with the related art corresponds to a system manager 900 in an ISA100 system. The ISA100 system manager 900 assigns a time (communication time slot), a space (communication path), and a frequency (use radio channel), which are communication resources, to a device under control thereof.

The ISA100 system manager 900 is a system in which it is assumed that the communication resource assignment is dynamically performed during system operation. The ISA100 system manager 900 has a function of searching for a resource that can be assigned at the stage in which each device notifies the system manager of a communication resource request, and transmitting resource information assigned to the request source device and an associated device.

The ISA100 system manager 900 illustrated in FIG. 5 has both functions of the communication resource assignment tool 100 and the communication resource distribution system 200 in accordance with the present invention. When the present invention is applied to the ISA100, the communication resource assignment tool 100 is implemented by a computer having a high calculation capability.

A condition of a communication environment or application information desired by the user is input to the communication resource assignment tool 100. For example, the communication environment includes communication path information, communication band information, a use radio channel, and the like. The application information includes a communication period, a communication partner, a data length, and the like. The communication resource assignment tool 100 assigns communication resources satisfying the above condition and constructs prior setting information.

In case of the ISA100, for example, prior setting information includes assignment address information, a routing table, a role given to each device, wireless communication link information between two devices, radio channel setting, and the like. The communication resource distribution system 200 is notified of the assigned prior setting information. The communication resource distribution system 200 transmits the assignment result based on the prior setting information in response to the communication resource assignment request from the management target device that configures the ISA100.

As described in the first preferred embodiment illustrated in FIG. 1, when the communication resources are statically assigned, it is effective to separate a function of assigning communication resources from a function of distributing communication resources during system operation due to calculation capability or a problem related to cooperation with another system.

However, when the system is configured to separate the function of statically assigning communication resources before system operation from the function of distributing communication resources during system operation, the following problems may occur.

(1) An initial state of a communication environment considered when communication resources are assigned before system operation changes as a time elapses. The initially considered environment changes during an operation, and a problem is likely to occur during system operation.

The resource assignment information 300 output from the communication resource assignment tool 100 is fixed to an initial setting value, and the communication resource distribution system 200 does not have a function of re-assigning communication resources. Thus, it is difficult for the system to acquire the latest communication environment data.

(2) An initial network configuration considered when communication resources are assigned changes during system operation together with a communication environment, and communication resources necessary for each device change in association with the change. Even when it is desired to add a network topology or a terminal during network operation, it is difficult to re-assign resources during an operation in a separate method having no dynamical assigning function.

Fifth Preferred Embodiment

Figure 6:
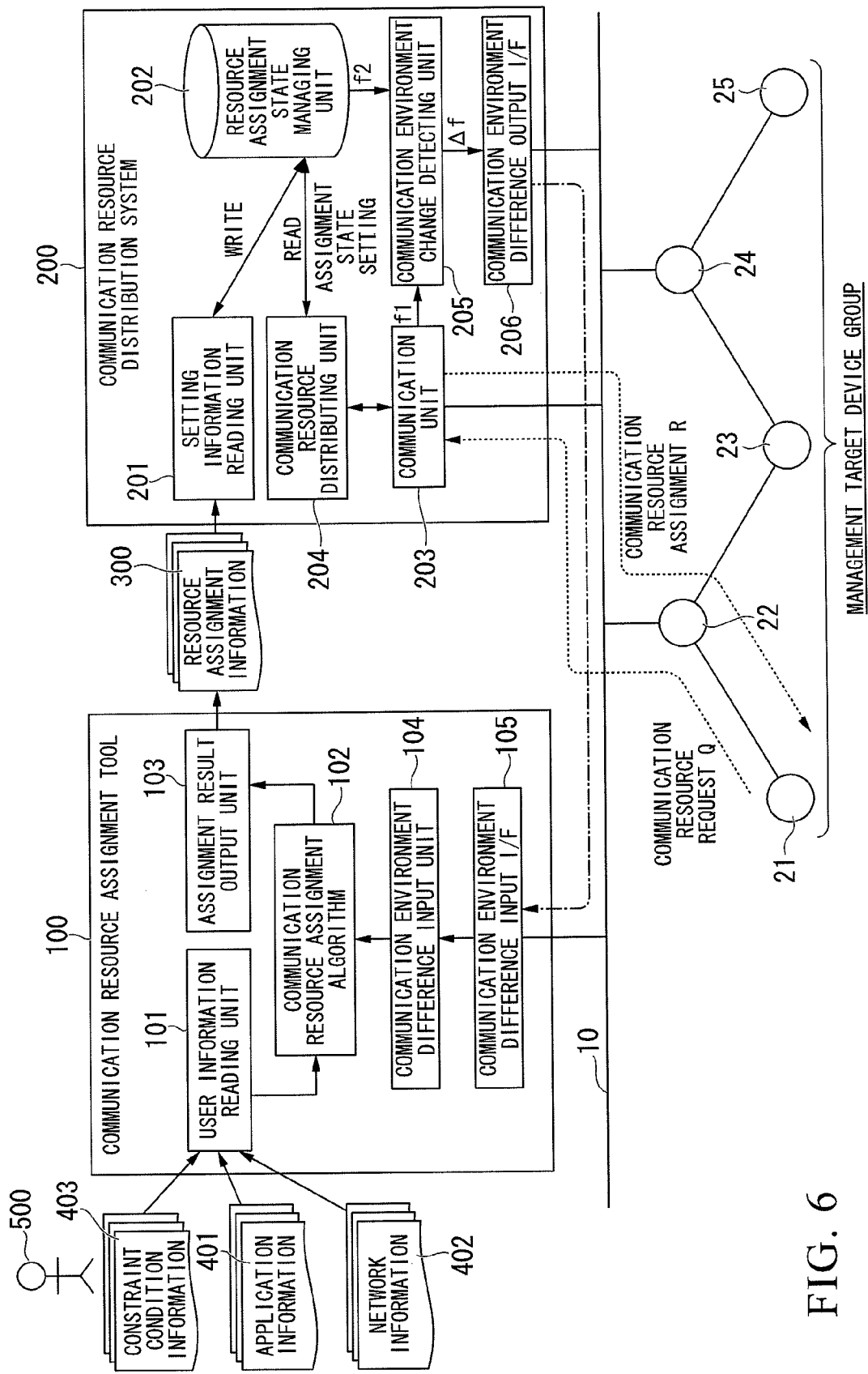
FIG. 6 is a functional block diagram illustrating a communication resource assignment system in accordance with a fifth preferred embodiment of the present invention.

FIG. 6 is a functional block diagram illustrating a communication resource assignment system in accordance with a fifth preferred embodiment of the present invention. The above problems (1) and (2) are solved by the fifth preferred embodiment. In the fifth preferred embodiment, the calculation function of the communication resource assignment algorithm 102 of the communication resource assignment tool 100 is dynamically revised based on an environment change which is likely to occur during system operation.

In the communication resource assignment tool 100, a communication environment difference input unit 104 and a communication environment difference input interface 105 are added to the configuration of the first preferred embodiment illustrated in FIG. 1. Further, in the communication resource distribution system 200, a communication environment change detecting unit 205 and a communication environment difference output interface 206 are added.

The communication environment difference input unit 104 receives a communication environment change difference $\Delta f$ which is transmitted from the communication resource distribution system 200 side via the network 10 through the communication environment difference input interface 105, and transfers difference information to the communication resource algorithm 102 or accumulates the difference information.

The communication environment difference input unit 104 notifies the communication resource assignment algorithm 102 of the communication environment change difference $\Delta f$ by a trigger such as an information amount or an accumulation time which a system defines from the accumulated difference information.

The communication resource assignment algorithm 102 that has received the communication environment change difference $\Delta f$ performs resource assignment in terms of a change difference or accumulates difference information. When the resource assignment is performed, the resource assignment information 300 appropriate for the difference information is re-calculated and then output. When the difference information is accumulated, the resource assignment information 300 appropriate for the difference information is re-calculated and then output by a trigger such as an information amount or an accumulation time which a system defines based on the accumulated difference information.

The communication environment change detecting unit 205 of the communication resource distribution system 200 receives current communication environment information f1 acquired from the communication unit 203 and current static prior setting information f2 acquired from the communication environment resource assignment state managing unit 202, and calculates the communication environment change difference Δf. The calculated communication environment change difference Δf is transmitted to the communication environment difference input interface 105 at the communication resource assignment tool 100 side via the network 10 through the communication environment difference output interface 206.

Through this configuration, the communication resource distribution system 200 can notify of a change in a communication environment from an initial state assigned by the communication resource assignment tool 100 or detect the change in the communication environment. As a result, the communication resource distribution system 200 can re-assign optimum communication resources following the change in the communication environment to the management target device.

According to the fifth preferred embodiment, by collecting a change in an environment as necessary and notifying the communication resource assignment tool 100 of the change in the environment, efficient communication resource assignment can be more realistically performed by the communication resource assignment tool 100. Thus, a reliable communication environment corresponding to a communication environment change can be maintained.

The communication resource distribution system 200 has a simple structure, and can be implemented in a powerless machine by separating the communication resource assignment tool 100 that performs complicated processing as a separate function. According to the fifth preferred embodiment, by notifying a difference in a communication environment and following a change in a communication environment while leaving the communication resource assignment function in the communication resource assignment tool 100, an advantage of a separate method, which is one of features of the present invention, can be obtained.

Figure 7:
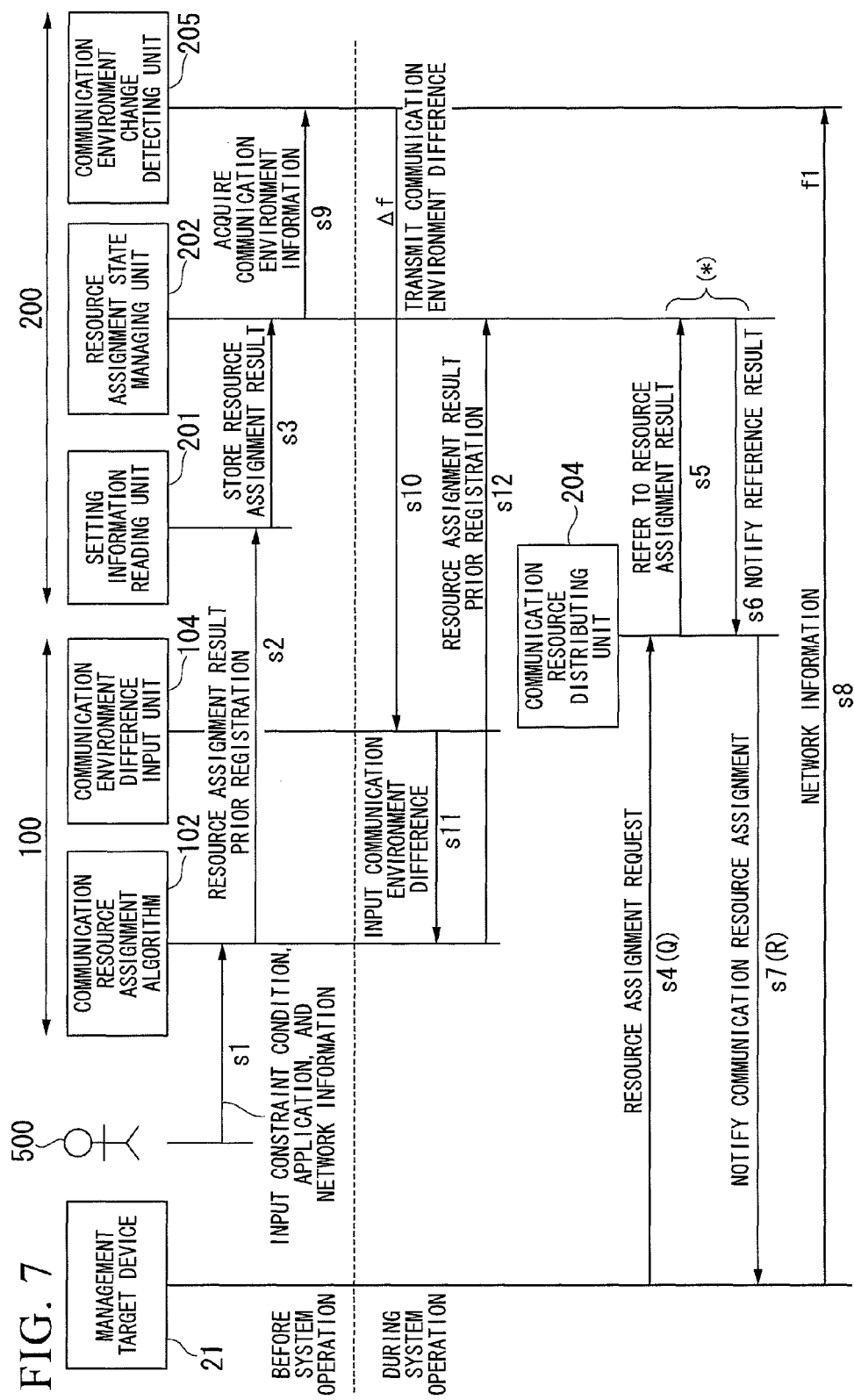
FIG. 7 is a sequence diagram to explain an operation of the communication resource assignment system illustrated in FIG. 6.

FIG. 7 is a sequence diagram to explain an operation of the communication resource assignment system illustrated in FIG. 6. Sequences s1 to s7 are the same as in the sequence diagram illustrated in FIG. 2. Sequences s8 to s12 are added to the sequence diagram illustrated in FIG. 2.

In sequence s8, the management target device 21 notifies the communication environment change detecting unit 205 of the network information f1 during system operation.

In sequence s9, at the same time as sequence s8 or at predetermined sample periods, the communication environment change detecting unit 205 acquires the communication environment information f2 from the resource assignment state managing unit 202.

In sequence s10, the communication environment change detecting unit 205 transmits the communication environment difference Δf to the communication environment difference input unit 105 of the communication resource assignment tool 100.

In sequence s11, the communication environment difference Δf is input from the communication environment difference input unit 105 to the communication resource assignment algorithm 102, the initially set resource assignment information is revised, and sequences s2 and s3 are re-executed to revise data of the resource assignment state managing unit 202.

Figure 8:
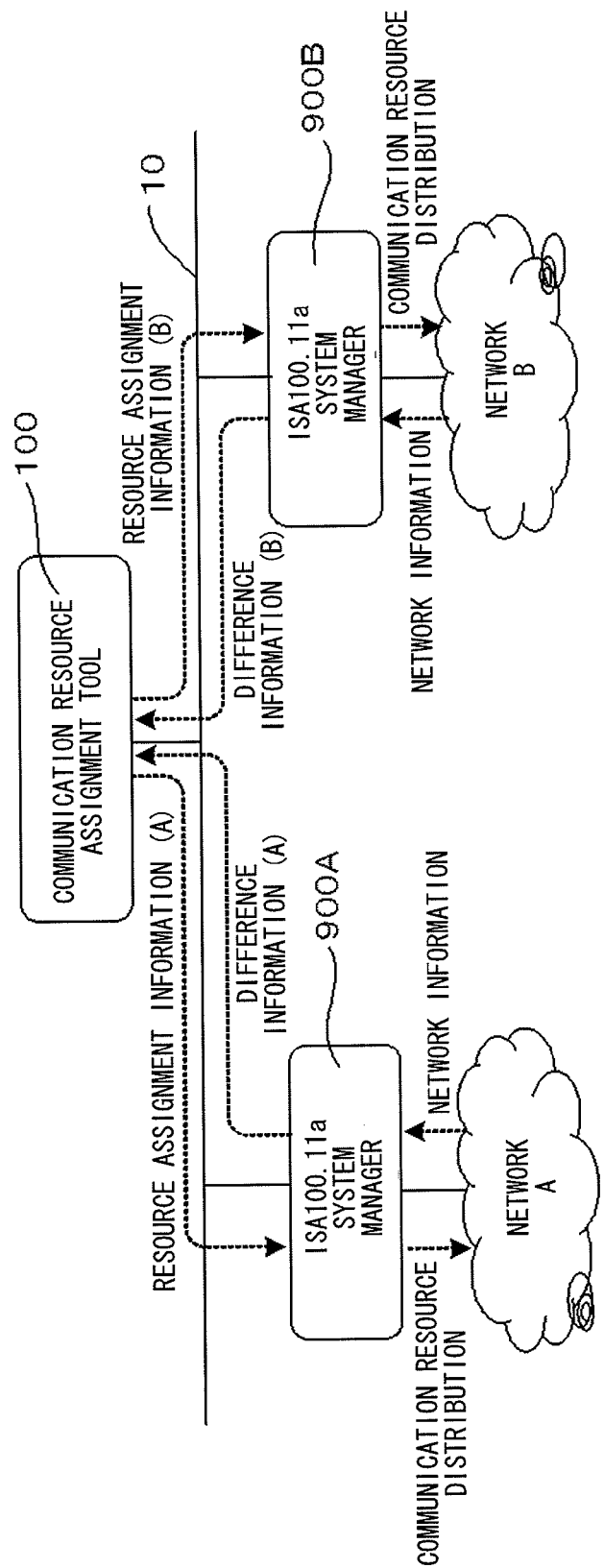
FIG. 8 is a functional block diagram to explain collection of difference information by the ISA100 system manager illustrated in FIG. 5.

FIG. 8 is a functional block diagram to explain collection of difference information by the ISA100 system manager illustrated in FIG. 5. The communication resource assignment tool 100 transmits resource assignment information A and B to a plurality of ISA100 system managers 900A and 900B connected via the network 10, respectively.

Each of the ISA100 system managers 900A and 900B has a function of distributing communication resources to a management target device that belongs to each of networks A and B managed by itself, acquiring network information from each of the networks A and B, and calculating difference information.

The ISA100 system managers 900A and 900B transmit difference information A and difference information B to the communication resource assignment tool 100 via the network 10. The communication resource assignment tool 100 revises resource assignment information A and resource assignment information B based on the difference information from each ISA100 system manager and re-distributes the revised resource assignment information to the ISA100 system managers 900A and 900B.

In the preferred embodiment illustrated in FIG. 8, the communication resource assignment algorithm in the communication resource assignment tool 100 receives information (a constraint condition, application information, network information, and the like) for performing initial communication resource distribution and outputs prior setting information.

The prior setting information is input to the system manager which is the communication resource distribution system, and a communication resource is distributed to a management target device of a network managed by each system managed based on the prior setting information.

In a network in which a management target device operates, the network is operated based on communication resources distributed before an operation starts. However, a communication environment changes with the passage of time (the number of thermals changes, a radio wave environment changes, or a communication device arrangement position changes).

The management target device notifies the system manager of these changes as difference information by a health report or the like. The notified difference information is input to the communication resource assignment tool 100 as difference information. The input difference information is used for a calculation for communication resource redistribution in the communication resource assignment tool 100.

The calculated resource assignment information is re-used to re-assign communication resources to a management target device through the system manager. By inputting the difference information, in ISA100.11a, which is an industrial wireless network requiring high reliability, it is possible to follow a change in a communication environment in the separate system of the present invention.

As used herein, the following directional terms "forward, rearward, above, downward, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A communication resource assignment system in which a plurality of management target devices, which are connected to a network and perform communication with each other, request a communication resource distribution system to distribute communication resources via the network, the communication resource assignment system comprising:
   a communication resource assignment tool that includes a communication resource assignment algorithm that receives previously acquired user information, and outputs resource assignment information calculated by the communication resource assignment algorithm;
   a resource assignment state managing unit that receives and stores the resource assignment information output from the communication resource assignment tool; and
   a communication resource distributing unit that accesses the resource assignment state managing unit, reads the resource assignment information, and transmits the read resource assignment information to a management target device that outputs a communication resource request among a plurality of management target devices that perform communication with each other via a network, the communication resource distributing unit being separate from the communication resource assignment tool,
   wherein the communication resource distribution system is configured to access and read communication resource assignment information stored in the resource assignment state managing unit, and to transmit the read communication resource assignment information to the management target devices that have made a request,
   wherein the communication resource distribution system includes a communication environment change detecting unit configured to detect a communication environment difference between the resource assignment information stored in the resource assignment state managing unit and current resource assignment information of the management target device acquired via the network,
   wherein the communication resource assignment tool includes a communication environment difference input unit configured to acquire the communication environment difference and to revise the communication resource assignment algorithm, and
   wherein the communication resource assignment algorithm calculates the resource assignment information by considering a change difference of the communication environment difference.

2. The communication resource assignment system according to claim 1, wherein the resource assignment state managing unit acquires the resource assignment information via a file unit from the communication resource assignment tool.

3. The communication resource assignment system according to claim 1, wherein the resource assignment state managing unit acquires the resource assignment information via the network by the communication resource assignment tool.

4. The communication resource assignment system according to claim 1, wherein the resource assignment information is editable by a user or another system.

5. The communication resource assignment system according to claim 1, wherein the user information includes at least one of network information, application information, and constraint condition information.

6. The communication resource assignment system according to claim 1, wherein the communication resource assignment algorithm accesses an external calculation library and uses resources of the external calculation library.

7. The communication resource assignment system according to claim 1, wherein the communication resource assignment tool distributes resource assignment information of management target devices that perform communication with a plurality of communication resource distribution units connected via the network, respectively, to the plurality of communication resource distribution units.

8. A computer implemented method for assigning communication resources in a communication resource distribution system comprising:
   generating resource assignment information calculated by a communication resource assignment tool using a communication resource assignment algorithm that receives previously acquired user information;
   storing the generated resource assignment information; and
   reading the stored resource assignment information; and
   transmitting, by a communication resource distributing unit that is separated from the communication resource assignment tool, the read resource assignment information to a management target device that outputs a communication resource request among a plurality of management target devices that perform communication with each other via a network,
   wherein the communication resource distribution system is configured to access and read communication resource assignment information stored in a resource assignment state managing unit, and to transmit the read communication resource assignment information to management target devices that have made a request,
   wherein the communication resource distribution system includes a communication environment change detecting unit configured to detect a communication environment difference between the resource assignment information stored in the resource assignment state managing unit and current resource assignment information of the management target device acquired via the network,
   wherein the communication resource assignment tool includes a communication environment difference input unit configured to acquire the communication environment difference and to revise the communication resource assignment algorithm, and
      wherein the communication resource assignment algorithm calculates the resource assignment information by considering a change difference of the communication environment difference.

9. The computer implemented method according to claim 8, further comprising:
   acquiring the resource assignment information via a file unit.

10. The computer implemented method according to claim 8, further comprising:
   acquiring the resource assignment information via the network.

11. The computer implemented method according to claim 8, wherein the resource assignment information is editable by a user or another system.

12. The computer implemented method according to claim 8, wherein the user information includes at least one of network information, application information, and constraint condition information.

13. The computer implemented method according to claim 8, further comprising:
   accessing an external calculation library and using resources of the external calculation library.

14. The computer implemented method according to claim 8, further comprising:
   detecting a communication environment difference between the stored resource assignment information and current resource assignment information of a management target device acquired via a network; and
   acquiring the communication environment difference and revising the communication resource assignment algorithm.

* * * * *